(12) United States Patent
Welsh (10) Patent No.: US 10,399,382 B2
(45) Date of Patent: Sep. 3, 2019

(54) IRRIGATION SYSTEM PROPULSION WHEELS AND METHODS OF MAKING

(71) Applicant: Matthew E. Welsh, Union Mills, IN (US)

(72) Inventor: Matthew E. Welsh, Union Mills, IN (US)

(73) Assignee: Matthew E. Welsh, Union Mills, IN (US)

( * ) Notice: Subject to any disclaimer, the term of this patent is extended or adjusted under 35 U.S.C. 154(b) by 101 days.

(21) Appl. No.: 15/435,513

(22) Filed: Feb. 17, 2017

(65) Prior Publication Data

US 2017/0239981 A1    Aug. 24, 2017

Related U.S. Application Data

(60) Provisional application No. 62/297,263, filed on Feb. 19, 2016.

(51) Int. Cl.
| B60B 15/02 | (2006.01) |
| B60B 3/00 | (2006.01) |
| A01G 25/09 | (2006.01) |

(52) U.S. Cl.
CPC ............. *B60B 15/02* (2013.01); *A01G 25/09* (2013.01); *B60B 3/007* (2013.01); *B60B 2310/222* (2013.01); *B60B 2320/10* (2013.01); *B60B 2360/102* (2013.01); *B60B 2900/212* (2013.01); *B60B 2900/551* (2013.01)

(58) Field of Classification Search
CPC ... B60B 15/02; B60B 3/007; B60B 2310/222; B60B 2900/212; B60B 2900/551; B60B 2320/10; B60B 2360/102; A01G 25/09

USPC ................. 301/43, 44 B, 45, 53, 56, 59
See application file for complete search history.

(56) References Cited

U.S. PATENT DOCUMENTS

| 1,923,196 | A | * | 8/1933 | Fortescue | B60B 15/02 301/44.4 |
| 2,106,135 | A | * | 1/1938 | Henry | B60B 15/02 301/52 |
| 4,023,511 | A | * | 5/1977 | Newman | A01O 5/045 111/89 |
| 5,046,785 | A | * | 9/1991 | Bockerman | B60B 15/02 301/43 |
| 5,865,916 | A | * | 2/1999 | Woolley | B60C 27/04 152/225 R |
| 8,657,215 | B1 | * | 2/2014 | Blum | B60B 1/10 239/726 |
| 2005/0224152 | A1 | * | 10/2005 | Zumach | B60C 27/18 152/222 |

* cited by examiner

*Primary Examiner* — S. Joseph Morano
*Assistant Examiner* — Jean W Charleston
(74) *Attorney, Agent, or Firm* — Hartman Global IP Law; Gary M. Hartman; Domenica N. S. Hartman (57) ABSTRACT

Wheels adapted to roll on and across surfaces of fields, for example, as part of irrigation systems of types used in agricultural applications. Such a wheel has an axis of rotation, a center portion comprising a central hub concentrically disposed on the axis of the wheel and multiple spokes radiating from the central hub, and a tread portion circumscribing the center portion. A radially outermost extent of each spoke terminates at a spade that is oriented parallel to the axis of the wheel. The tread portion includes tread plates, each located between and attached to adjacent pairs of the spokes. The spades protrude radially outward between and beyond adjacent pairs of the tread plates.

13 Claims, 7 Drawing Sheets

IRRIGATION SYSTEM PROPULSION WHEELS AND METHODS OF MAKING

CROSS REFERENCE TO RELATED APPLICATIONS

This application claims the benefit of U.S. Patent Application Ser. No. 62/297,263, filed Feb. 19, 2016, the contents of which are incorporated herein by reference.

BACKGROUND OF THE INVENTION

The present invention generally relates to wheels configured for propelling objects and structures on the ground, and particularly to wheels suitable for propelling or supporting irrigations systems and other equipment traveling across agricultural fields.

Figure 1:
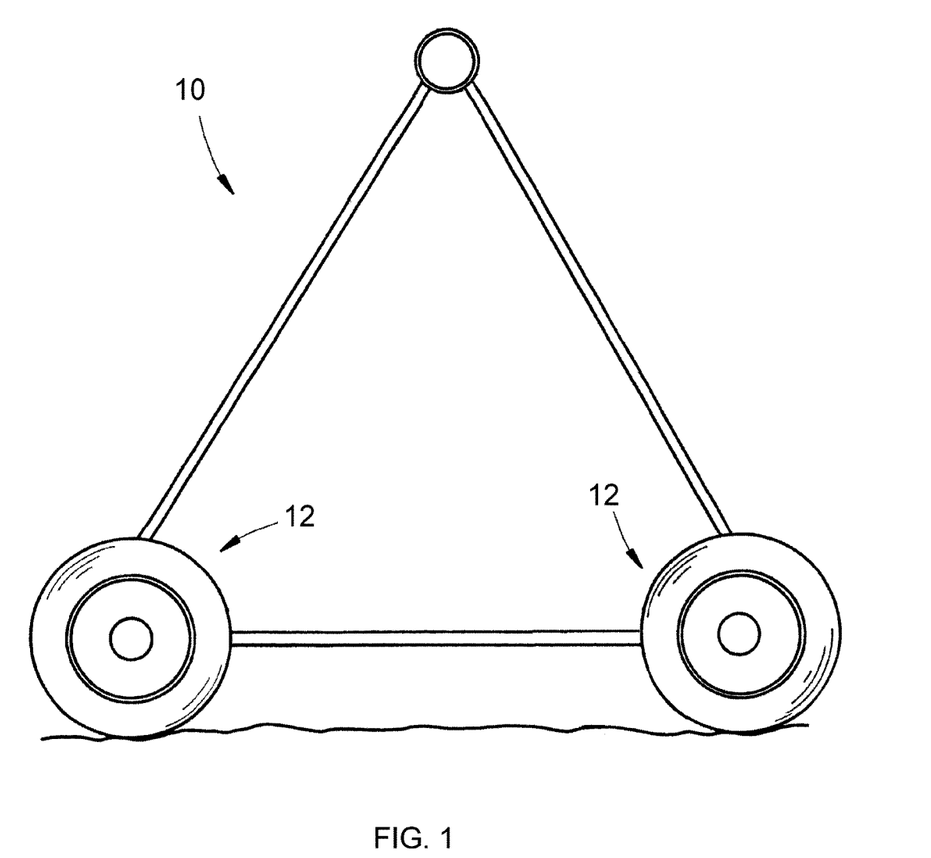
FIG. 1 schematically represents a portion of a center-pivot irrigation system of a type used in agricultural applications.

FIG. 1 schematically represents a nonlimiting example of a portion of a center-pivot irrigation system 10 of a type used in agricultural applications. In FIG. 1, structural members of the system 10 can be seen to be equipped with wheels 12 that support the system 10 as it moves across the ground of a field. The wheels 12 are represented as inflated tires, which are prone to puncture hazards in their path.

BRIEF DESCRIPTION OF THE INVENTION

The present invention provides wheels adapted to roll on and across surfaces of fields, for example, as part of irrigation systems of types used in agricultural applications. The wheels are suitable for use as replacements for conventional wheels and pneumatic tires commonly used in agricultural irrigation systems.

According to one aspect of the invention, the wheel has an axis of rotation, a center portion comprising a central hub concentrically disposed on the axis of the wheel and multiple spokes radiating from the central hub, and a tread portion circumscribing the center portion. A radially outermost extent of each spoke terminates at a spade that is oriented parallel to the axis of the wheel. The tread portion includes tread plates each having a tread surface region. Each tread plate is between and attached to adjacent pairs of the spokes, and the spades of the center portion protrude radially outward beyond adjacent pairs of the tread plates.

According to another aspect of the invention, a method of fabricating a wheel includes providing a one-piece flat pattern having a hub portion from which radiating arms emanate relative to an axis of the flat pattern located within the hub portion. Each radiating arm is twisted to form one spoke of a center portion of the wheel and an outer radial end of the arm forms a spade of the spoke. Tread plates are then individually attached between adjacent pairs of the spades.

A technical effect of the wheel is that it is not required to be inflated, and therefore is not prone to puncture hazards in its path. The wheel is also not required to be formed of rubber or another pliable material that can be prone to degradation by the weather, for example, as a result of being damaged by ultraviolet rays of the sun. In addition, the wheel does not require moving parts, and can be assembled without the need to interconnect a large number of parts.

Other aspects and advantages of this invention will be better appreciated from the following detailed description.

DETAILED DESCRIPTION OF THE INVENTION

FIGS. 2 through 4 and 6 through 8 represent various views of wheels 20 and 60 suitable for propelling an object or structure across a surface. The wheels 20 and 60 are particularly well suited for propelling an irrigation system across the surface of an agricultural field. Although the invention will be described hereinafter in reference to irrigation systems such as that shown in FIG. 1, it will be appreciated that the teachings of the invention are more generally applicable to a variety of applications in which a rugged wheel would be beneficial for transporting a structure across uneven ground typically encountered in an agricultural field.

To facilitate the description provided below of the embodiments represented in the drawings, relative terms may be used to describe the wheels 20 and 60 and their components, On the basis of coaxial arrangements of certain components of the wheels 20 and 60, relative terms including but not limited to "axial," "circumferential," "radial," etc., and related forms thereof may also be used to describe the nonlimiting embodiments represented in the drawings. All such relative terms are intended to indicate the construction and relative orientations of components and features of the wheels 20 and 60, and therefore are intended to indicate the construction, installation and use of the invention and therefore help to define the scope of the invention.

Figure 2:
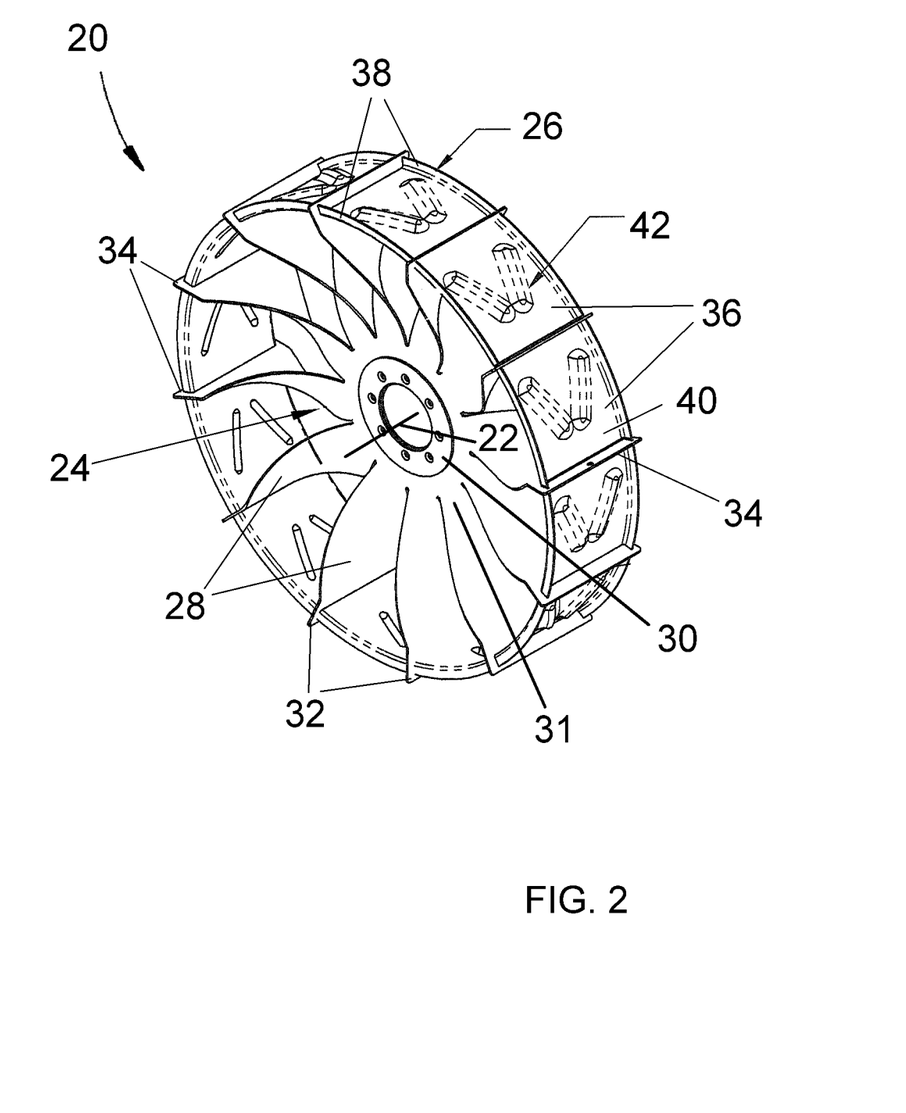
FIGS. 2, 3 and 4 represent perspective, top and side views of a wheel in accordance with a nonlimiting embodiment of this invention.
Figure 3:
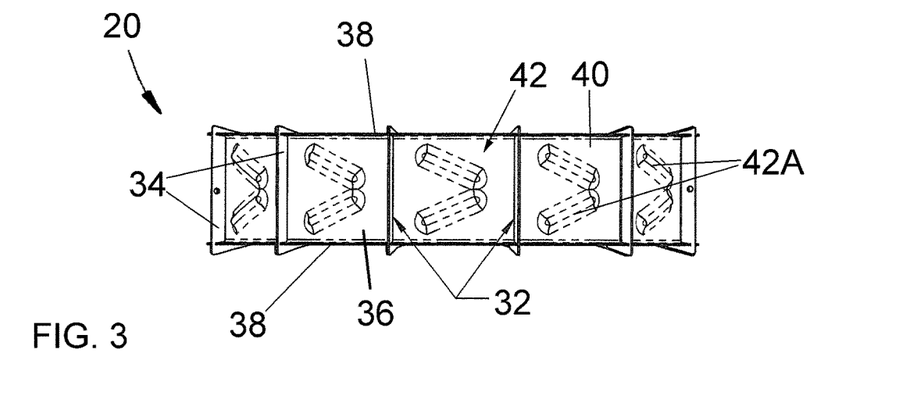
Figure 4:
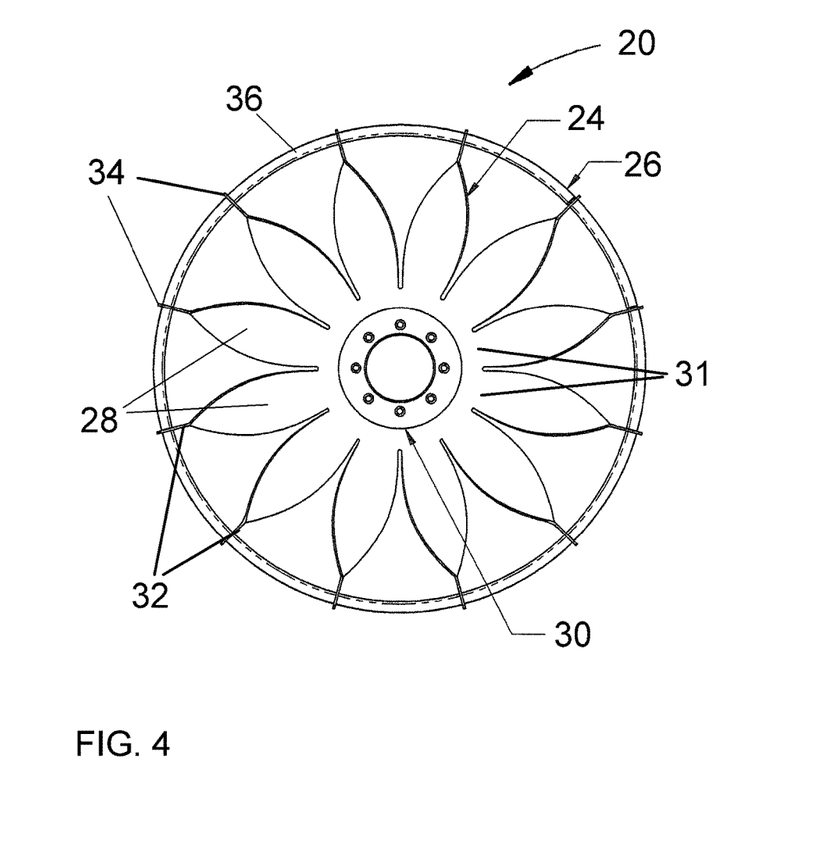

The wheel 20 depicted in FIGS. 2 through 4 has an axis 22 of rotation and is rotationally symmetrical about its axis 22. The wheel 20 has a wheel center portion 24 circumscribed by a tread portion 26. The center portion 24 comprises multiple spokes 28 radiating from a central hub 30 that is concentrically disposed on the axis 22 of the wheel 20. The hub 30 is preferably formed to define a central hub opening surrounded by a pattern of holes by which the wheel 20 can be mounted to a section of an irrigation system or other appropriate structure. Each spoke 28 has an approximately ninety-degree twist as a result of its radially innermost extent 31 lying in the plane of the center portion 24 and hub 30 so as to be approximately perpendicular to the axis 22 of the wheel 20, and its radially outermost extent 32 terminating at a spade 34 (or blade) that is oriented approximately parallel to the wheel axis 22. With this orientation, the spades 34 have axial widths in the axial direction of the wheel 20. The hub 30 can be reinforced with a plate as seen in FIGS. 2 and 4.

The tread portion 26 generally defines a cylindrical shape whose axis coincides with the axis 22 of the wheel 20. As represented in FIGS. 2 through 4, the tread portion 26 is constructed of multiple individual tread plates 36, each attached between an adjacent pair of spades 34 of the spokes 28. Each tread plate 36 has a width in the axial direction of the wheel 20 and a length in the circumferential direction of the wheel 20. Each tread plate 36 further defines along its length a radius of curvature having a center of curvature that approximately coincides with the axis 22 of the wheel 20, resulting in the tread plates 36 defining, in combination, the generally cylindrical shape of the tread portion 26. The radially outermost extents 32 of the spades 34 radially protrude from the circular shape of the tread portion 26 and generally lie on a circle that is substantially concentric with the cylindrical shape of the tread portion 26 as a result of having a center of curvature that coincides with the axis 22 of the wheel 20. In the embodiment shown in the Figures, the axial widths of the spades 34 preferably exceed the widths of the tread plates 36 on each axial side of the wheel 20.

Each tread plate 36 has a pair of rims or lips 38 projecting radially outward, preferably along the entire length of the plate 36. Each lip 38 is located along one of the lateral edges of the plate 36 that delimits the width of the plate 36, and is oriented generally perpendicular to the spades 34 to which the plate 36 is attached. With the spades 34 located at each circumferential end of a tread plate 36, the lips 38 located along the lateral edges of the plates 36 define a tread surface region 40 surrounded by a substantially continuous wall formed by the spades 34 and lips 38. The tread surface region 40 is recessed below the continuous wall, and therefore are preferably capable of partially containing soil contacted by the tread plates 36 as the wheel 20 rotates and traverses the soil. As a result, soil traversed by the wheel 20 after being wetted by an irrigation system will remain at least partially contained within the wheel track (rut) created by the continual traversing of the wheel 20 over the same path.

The tread plates 36 are preferably formed to include an embossed pattern 42 that protrudes radially outward from the tread surface region 40. The embossed pattern 42 is shown in FIGS. 2 and 3 as comprising two raised linear portions 42A that converge to give the pattern 42 an approximate V-shape, which aids in the clean out of soil over which the wheel 20 traverses.

Figure 5:
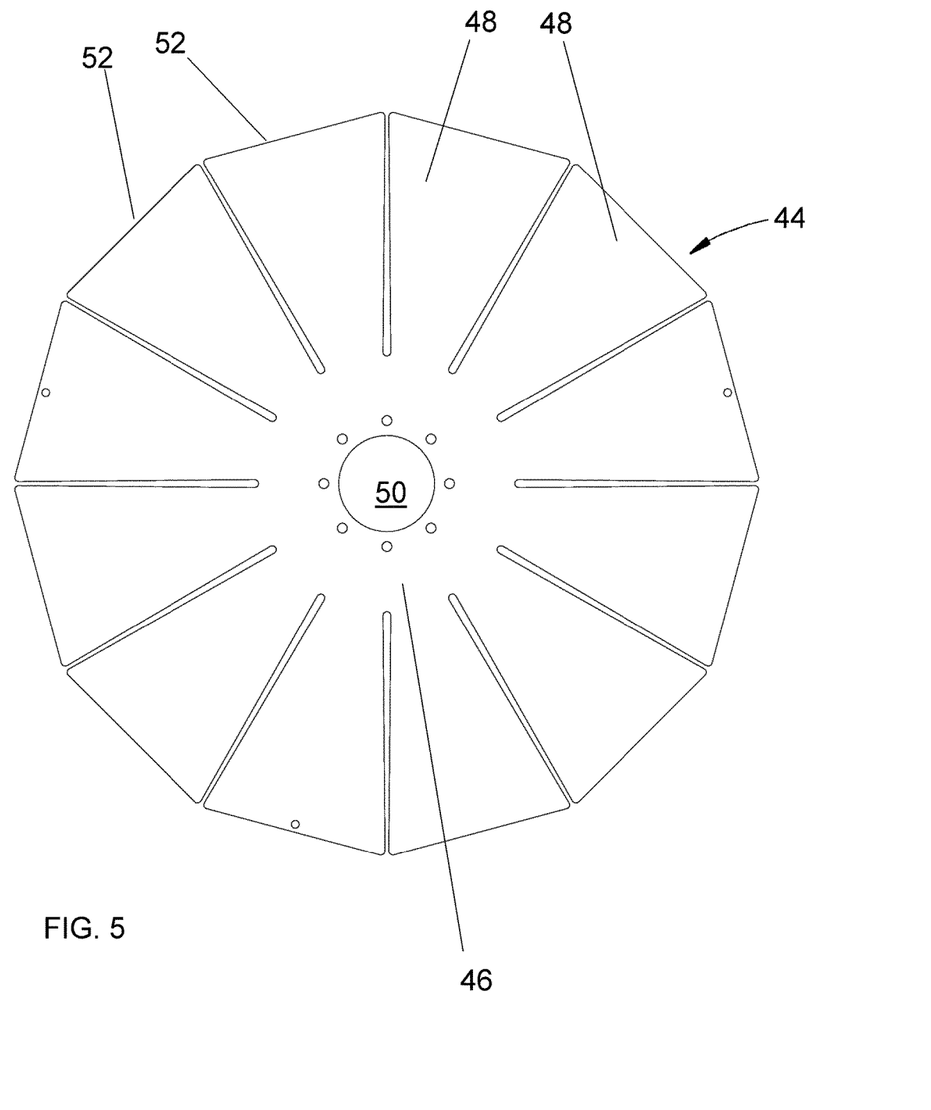
FIG. 5 is a plan view of a flat pattern suitable for fabricating a wheel center portion of the wheel shown in FIGS. 2, 3 and 4.

The center portion 24 of the wheel 20, including its spokes 28 and hub 30, can be fabricated from a single piece, for example, from a flat pattern 44 represented in FIG. 5 as having a central hub portion 46 that defines the hub 30 of the wheel 20 and from which radiating arms 48 emanate, each arm 48 increasing in its width in the radially outward direction. The pattern 44 is depicted as having a central opening 50 within the hub portion 46 that will define the central hub opening of the wheel 20. The center portion 24 of the wheel 20 can be fabricated from the pattern 44 by twisting each radiating arm 48 to form one of the spokes 28, so that the outer radial ends 52 of the arms 48 form the spades 34 of the spokes 28. As such, each radiating arm 48 is preferably twisted until its outer radial end 52 is roughly perpendicular to its original orientation within the pattern 44, and is parallel to the axis 22 of the hub 30 (wheel). Thereafter, the individual tread plates 36 can be attached between adjacent spades 34 in any suitable manner, such as by welding, bolts, etc. The attachment of the tread plates 36 to the spades 34 confers structural integrity to the wheel 20. The ability to form the entire center portion 24 of the wheel 20 from a one-piece flat pattern 44 can greatly decrease the fabrication time and costs related to the manufacturing of the wheel 20.

The center portion 24 and tread plates 36 of the wheel 20 can be fabricated from various structural materials, nonlimiting examples of which include corrosion-resistant steels, optionally galvanized to further promote corrosion resistance. The wheel 20 can be fabricated in various axial widths and diameters and to have various numbers of spokes 28. As nonlimiting examples, wheels 20 can be manufactured in different size models for irrigation applications, including diameters of about forty-eight inches (about 1.2 meters) with twelve spokes 28 and sixty inches with fourteen spokes 28 (about 1.5 meters).

Figure 6:
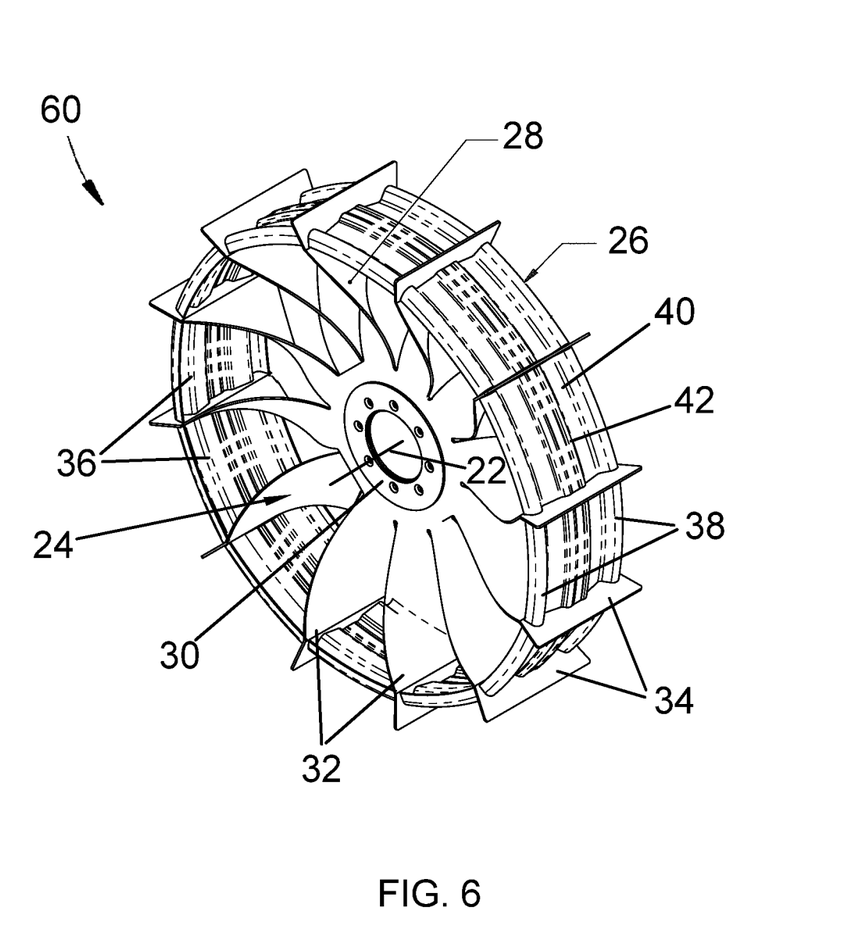
FIGS. 6, 7 and 8 represent perspective, top and side views of a wheel in accordance with another nonlimiting embodiment of this invention.
Figure 7:
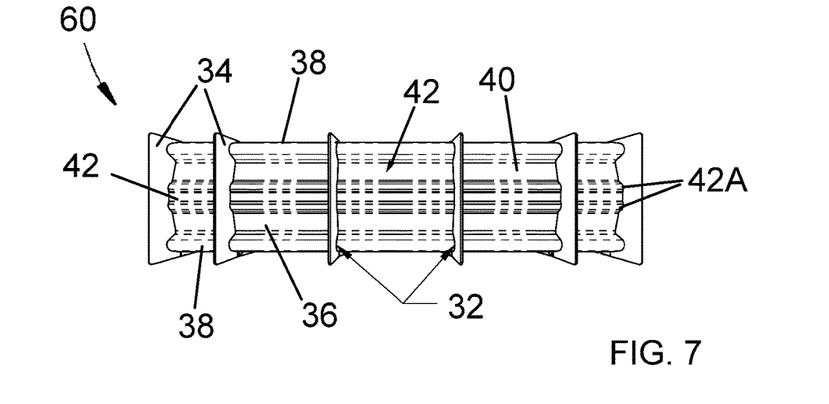
Figure 8:
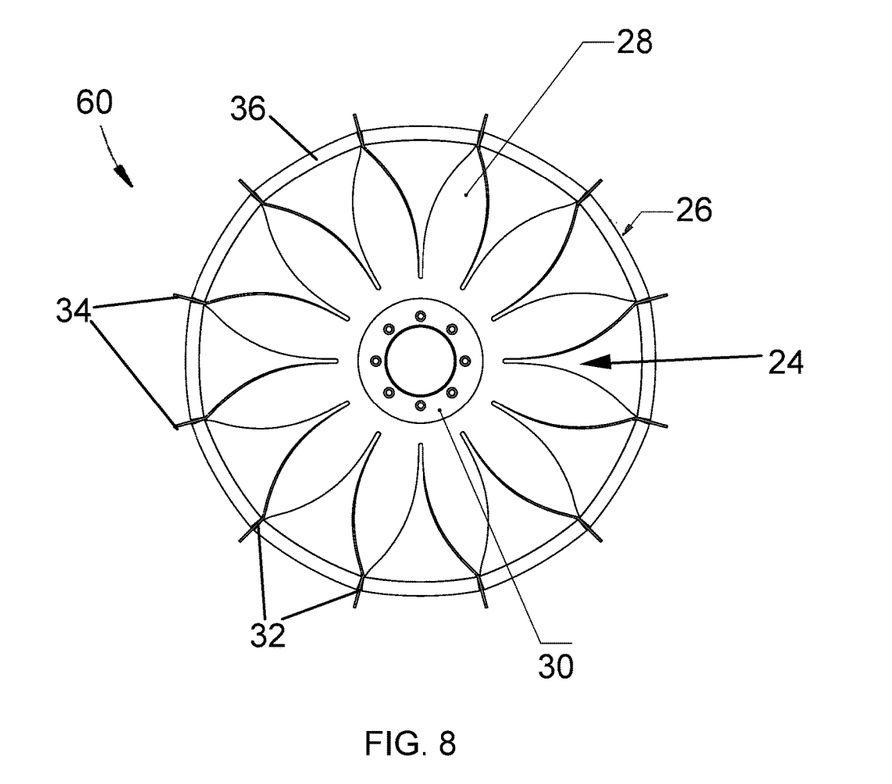

In view of similarities with the first embodiment of FIGS. 2 through 4, the following discussion of the wheel 60 depicted in FIGS. 6 through 8 will focus primarily on aspects of the wheel 60 that differ from the first embodiment in some notable or significant manner. Other aspects of the wheel 60 not discussed in any detail can be, in terms of structure, function, fabrication, materials, etc., essentially as was described for the wheel 20. For convenience, identical reference numerals are used in FIGS. 6 through 8 to denote the same or functionally related elements described for the wheel 60 of FIGS. 6 through 8.

Figure 9:
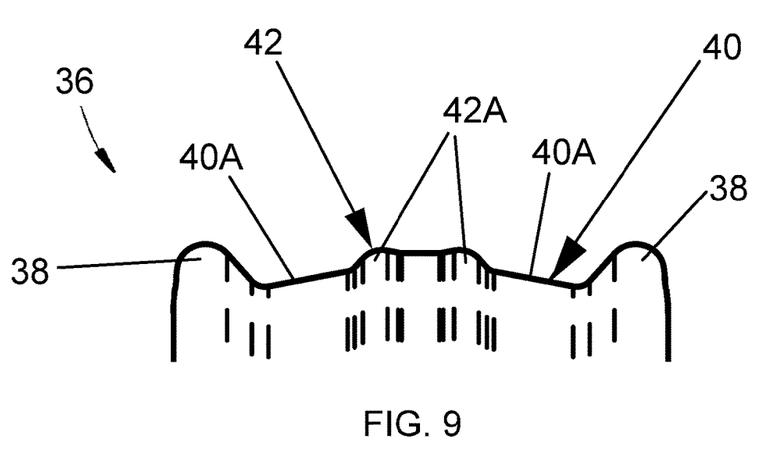
FIG. 9 shows a profile view of a tread plate of the wheel shown in FIGS. 6, 7, and 8.

The tread plates 36 of the wheel 60 shown in FIGS. 6, 7 and 8 include an embossed pattern 42 that protrudes radially outward from the tread surface region 40. FIG. 9 schematically represents the profile of one of the tread plates 36 of FIGS. 6, 7 and 8. The embossed pattern 42 shown in FIGS. 6, 7 and 9 comprises a central raised linear portion that protrudes radially outward from the tread surface region 40, onto which are superimposed two raised linear portions 42A that further protrude radially outward from the tread surface region 40. The tread surface region 40 has two tapered regions 40A that slope radially inward in opposite axial directions away from the embossed pattern 42, so as to be between the pattern 42 and the lateral lips 38 of the tread plate 36. The raised linear portions 42A are parallel to each other instead of converging, and are believed to offer certain advantages over the embossed pattern 42 shown in FIGS. 2 and 3.

Figure 10:
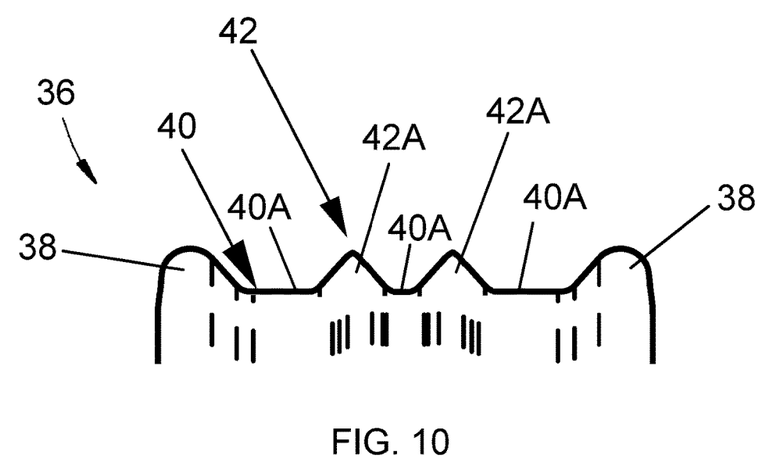
FIG. 10 shows a profile view of an alternative tread plate for the wheels shown in FIGS. 1 through 3 and 5 through 7.

FIG. 10 schematically represents the profile of an alternative tread plate 36 also formed to include an embossed pattern 42. In the embodiment of FIG. 10, the pattern 42 comprises two centrally-located raised linear portions 42A that are parallel to each other and protrude radially outward from the tread surface region 40. The tread surface region 40 has three regions 40A that are flat when viewed in profile and separate the raised linear portions 42A from each other and from the lateral lips 38 of the tread plate 36. The embossed pattern 42 of FIG. 10 is believed to offer certain performance advantages similar to the embossed pattern 42 of FIGS. 6, 7 and 8.

While the invention has been described in terms of a specific embodiment, it is apparent that other forms could be adopted by one skilled in the art. For example, the wheel center portion 24, tread portion 26, and patterns 44 from which they are fabricated could differ in appearance and construction from what is shown in the drawings, the functions of certain components could be performed by components of different construction but capable of a similar (though not necessarily equivalent) function, and various materials could be used in the construction of the wheel 20. Accordingly, it should be understood that the invention is not limited to the specific embodiment illustrated in the drawings. It should also be understood that the phraseology and terminology employed above are for the purpose of disclosing the illustrated embodiment, and do not necessarily serve as limitations to the scope of the invention. Therefore, the scope of the invention is to be limited only by the following claims.

The invention claimed is:

1. A wheel comprising:
   an axis of rotation;
   a center portion comprising a central hub portion concentrically disposed on the axis of the wheel and multiple spokes radiating from the central hub portion, a radially innermost extent of each spoke extending from the central hub portion and lying in a plane that is perpendicular to the axis of the wheel, a radially outermost extent of each spoke terminating at a spade that is oriented parallel to the axis of the wheel, each spoke having an approximately ninety-degree twist extending from the innermost extent to the outermost extent thereof; and
   a tread portion circumscribing the center portion, the tread portion comprising tread plates each having a tread surface region, each of the tread plates being between and attached to adjacent pairs of the spokes, the spades of the center portion protruding radially outward between and beyond adjacent pairs of the tread plates.

2. The wheel according to claim 1, wherein the central hub portion and each of the spokes of the center portion of the wheel are a single piece.

3. The wheel according to claim 1, wherein each tread plate has a width in an axial direction of the wheel and a length in a circumferential direction of the wheel, each tread plate having along the length thereof a radius of curvature having a center of curvature that coincides with the axis of the wheel.

4. The wheel according to claim 3, wherein at least some of the spades have axial widths that exceed the widths of the tread plates.

5. The wheel according to claim 3, wherein each tread plate has a pair of lips projecting radially outward entirely along the length of the tread plate.

6. The wheel according to claim 5, wherein each lip is located along one of two lateral edges of the tread plate that defines the width of the tread plate.

7. The wheel according to claim 6, wherein the lips of each tread plate are oriented perpendicular to the spades to which the tread plate is attached.

8. The wheel according to claim 5, wherein the spades are located at circumferential ends of the tread plates, and the spades and the lips associated with each tread plate define the tread surface region that is surrounded by a wall formed by the spades and the lips and is recessed below the wall.

9. The wheel according to claim 1, wherein the tread plates comprise an embossed pattern that protrudes radially outward from the tread surface region.

10. The wheel according to claim 9, wherein the embossed pattern comprises two raised linear portions that converge toward each other.

11. The wheel according to claim 9, wherein the embossed pattern comprises two raised linear portions that are parallel to each other and perpendicular to the spades of the wheel.

12. The wheel according to claim 1, wherein each spoke has a constant thickness and increases in width in a radially outward direction from the center portion of the wheel.

13. The wheel according to claim 1, wherein the wheel is installed on an agricultural irrigation system.

* * * * *